United States Patent [19]
Yang et al.

[11] Patent Number: 6,033,773
[45] Date of Patent: Mar. 7, 2000

[54] POLAR SELF-ASSEMBLED THIN FILMS FOR NON-LINEAR OPTICAL MATERIALS

[75] Inventors: XiaoGuang Yang; Basil I. Swanson; DeQuan Li, all of Los Alamos, N.Mex.

[73] Assignee: The Regents of the University of California, Los Alamos, N.Mex.

[21] Appl. No.: 08/844,718

[22] Filed: Apr. 18, 1997

[51] Int. Cl.[7] .................................. G02F 1/35; G02F 2/02
[52] U.S. Cl. .................... 428/333; 252/582; 359/328; 359/329; 359/330; 359/332; 385/122; 385/129; 385/130; 385/131; 428/405; 428/429; 428/447; 428/451
[58] Field of Search .......................... 252/582; 359/328, 359/329, 330, 332; 385/122, 129, 130, 131; 428/333, 336, 405, 429, 447, 451

[56] References Cited

U.S. PATENT DOCUMENTS 5,156,918   10/1992   Marks et al. ............................ 428/447
5,434,208   7/1995   Batelaan et al. ........................ 524/288

OTHER PUBLICATIONS

Erik Kelderman et al., "Highly Ordered Films of Neat Calix[4]arenes for Second Order Nonlinear Optics," Adv. Mater. vol. 5, No. 12, pp. 925–930 (1993).

DeQuan Li et al., "Chromophoric Self–Assembled Multilayers, Organic Superlattice Approaches to Thin–Film Nonlinear Optical Materials," J. Am. Chem. Soc. 112, pp., 7389–7390 (1990).

Willem Verboom et al., "Ipso Nitration of p–tert–Butylcalix[4]arenes," J. Org. Chem. 57, pp. 1313–1316 (1992).

Suk–Kyu Chang et al., "New Metal Cation–Selective Ionophores Derived From Calixarenes: Their Syntheses and Ion–Binding Properties," J. Chem. Soc. Perkin Trans. 1, pp. 211–214 (1986).

*Primary Examiner*—D. S. Nakarani
*Attorney, Agent, or Firm*—Bruce H. Cottrell

[57] ABSTRACT

The design and synthesis of a family of calix[4]arene-based nonlinear optical (NLO) chromophores are discussed. The calixarene chromophores are macrocyclic compounds consisting of four simple D-π-A units bridged by methylene groups. These molecules were synthesized such that four D-π-A units of the calix[4]arene were aligned along the same direction with the calixarene in a cone conformation. These nonlinear optical super-chromophores were subsequently fabricated into covalently bound self-assembled monolayers on the surfaces of fused silica and silicon. Spectroscopic second harmonic generation (SHG) measurements were carried out to determine the absolute value of the dominant element of the second-order nonlinear susceptibility, $d_{33}$, and the average molecular alignment, $\Psi$. A value of $d_{33}$=60 pm/V at a fundamental wavelength of 890 nm, and $\Psi \sim 36°$ was found with respect to the surface normal.

3 Claims, 6 Drawing Sheets

POLAR SELF-ASSEMBLED THIN FILMS FOR NON-LINEAR OPTICAL MATERIALS

FIELD OF THE INVENTION

The present invention relates to non-linear optical materials and more particularly to non-linear optical materials including calixarene-based chromophores. This invention was made with government support under Contract No. W-7405-ENG-36 awarded by the U.S. Department of Energy. The government has certain rights in the invention.

BACKGROUND OF THE INVENTION

Organic nonlinear optical (NLO) materials offer great potential for use in integrated optical devices. NLO thin-film materials have been fabricated by Langmuir-Blodgett (LB) techniques, molecular self-assembly, and electric field poling of functional polymers. The critical issue, however, remains the stability of the acentric alignment of the NLO chromophores.

Kelderman et al., (Adv. Mater. Vol. 5, 925 (1993)) have recently reported the study of poled neat calixarene films and calixarene-doped polymeric films for second-order nonlinear optics. They showed that "cone" conformation calix[4]arene chromophores exhibit large values of the second-order nonlinear susceptibility $d_{33}$ (6–11 pm/V at 30–60% wt) with a high degree of orientation.

An object of the present invention is to fix chromophore orientation at the molecular level by structural interlocking of dipolar molecules into cone-shaped supermolecules, and then to use these to build polar self-assembled monolayers.

SUMMARY OF THE INVENTION

To achieve the foregoing and other objects, and in accordance with the purposes of the present invention, as embodied and broadly described herein, the present invention provides a nonlinear optical material including a defined substrate, a silane coupling means bonded to said substrate, and a structurally interlocked chromophore, such interlocking between adjacent groups of chromophore units.

The present invention further provides a method of forming a nonlinear optical material by structually interlocking a multiple of dipolar molecules into a shaped supermolecule, and attaching the shaped supermolecule to a defined substrate.

DETAILED DESCRIPTION

The present invention is concerned with a molecular architectural approach to thin films aimed at achieving stable materials for NLO applications. The key strategy is to fix chromophore orientation at the molecular level by structural interlocking of dipolar molecules into cone-shaped supermolecules, and then to use these to build polar self-assembled monolayers.

The surface molecular building blocks are calix[4]arene derivatives, which consist of a multiple, e.g., four, NLO chromophore units bridged by methylene groups. The chromophores can typically be, e.g., stilbazole derivatives with a D-π-A structure, where D and A are electron donating and accepting groups, respectively, and π is a π-conjugated segment. This structural feature has been widely used to attain large values of the molecular second-order nonlinear susceptibility, β. In the present invention, the synthesis and characterization of a NLO calix[4]stilbazole imine derivative with the calixarene frozen in a cone conformation is presented. Furthermore, the construction of monolayers of the calixarene via covalent bonding to the silylated oxide surface, and second harmonic generation measurements on these self-assembled thin films is discussed. Larger $d_{33}$ values (60 pm/V) are found than those by Kelderman et al. (Adv. Mater. Vol. 5, 925 (1993)).

Figure 1A:
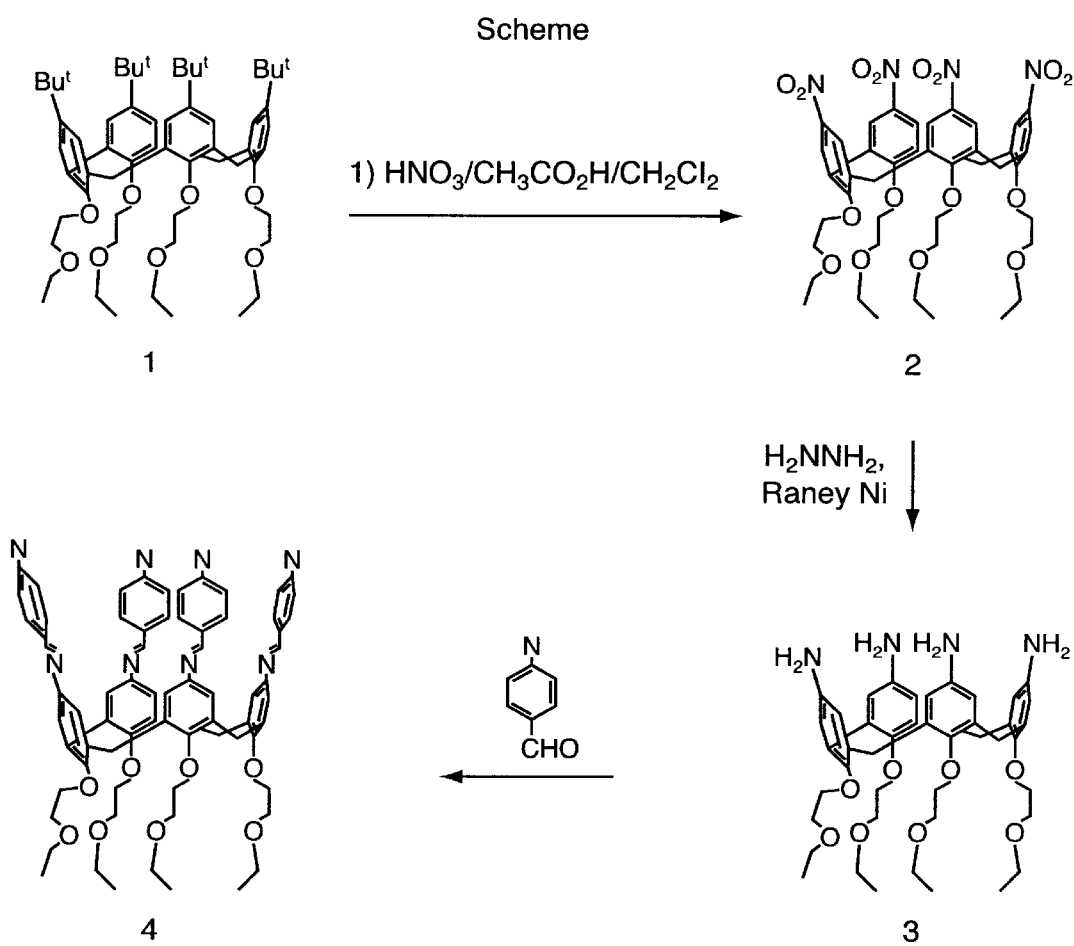
FIG. 1(a) is a schematic representation of the synthesis of surface building blocks—calix[4]arene-based molecular pyramids and strategy for the construction of self assembled monolayer architectures.

Although many functionalized calixarenes have been synthesized, preparation of calix[n]stilbazole (n=4, 6, 8) and its derivatives has been proven to be more difficult. The major synthetic considerations are the solubility and the conformation freezing of the calixarenes. Here the synthetic strategy was to initially "freeze" the calixarene in a cone conformation by substituting the lower rim of the calix[4]arene and then to functionalize the upper rim of the calixarene for the incorporation of pyridyl units. The synthesis of imine derivative of calix[4]stilbazole is depicted in the scheme shown in FIG. 1(a). Compound (1) and (2) were synthesized according to literature procedures (Chang et al. J. Chem. Soc. Perkin Trans., vol 1, pp211 (1986) and Verboom et al., J. Org. Chem., vol. 57, p. 1313 (1992)). Reduction of nitrocalixarene (2) gave p-aminocalix[4]arene (3). The condensation of p-amino-ethoxyethylethercalix[4]arene (3) with 4-pyridylcarboxaldehyde gave the desired NLO chromophore (4). All the structures were confirmed by $^1$H NMR and IR data. A proton $^1$H NMR spectrum of (4) in CDCl$_3$ indicated that (4) has a rigid "cone" conformation with the D-π-A dipolar units aligned in the same direction; this was manifested by the fact that bridging methylene protons split into two doublets with strong coupling between them (J=15 Hz). The presence of long ethoxyethyl groups prevents flip-over of the individual rigid rod-like stilbazole units in (4) and the "cone" conformation is virtually frozen at room temperature. It is noteworthy, however, that the condensation reaction failed when the formyl and amino groups were switched.

Figure 1B:
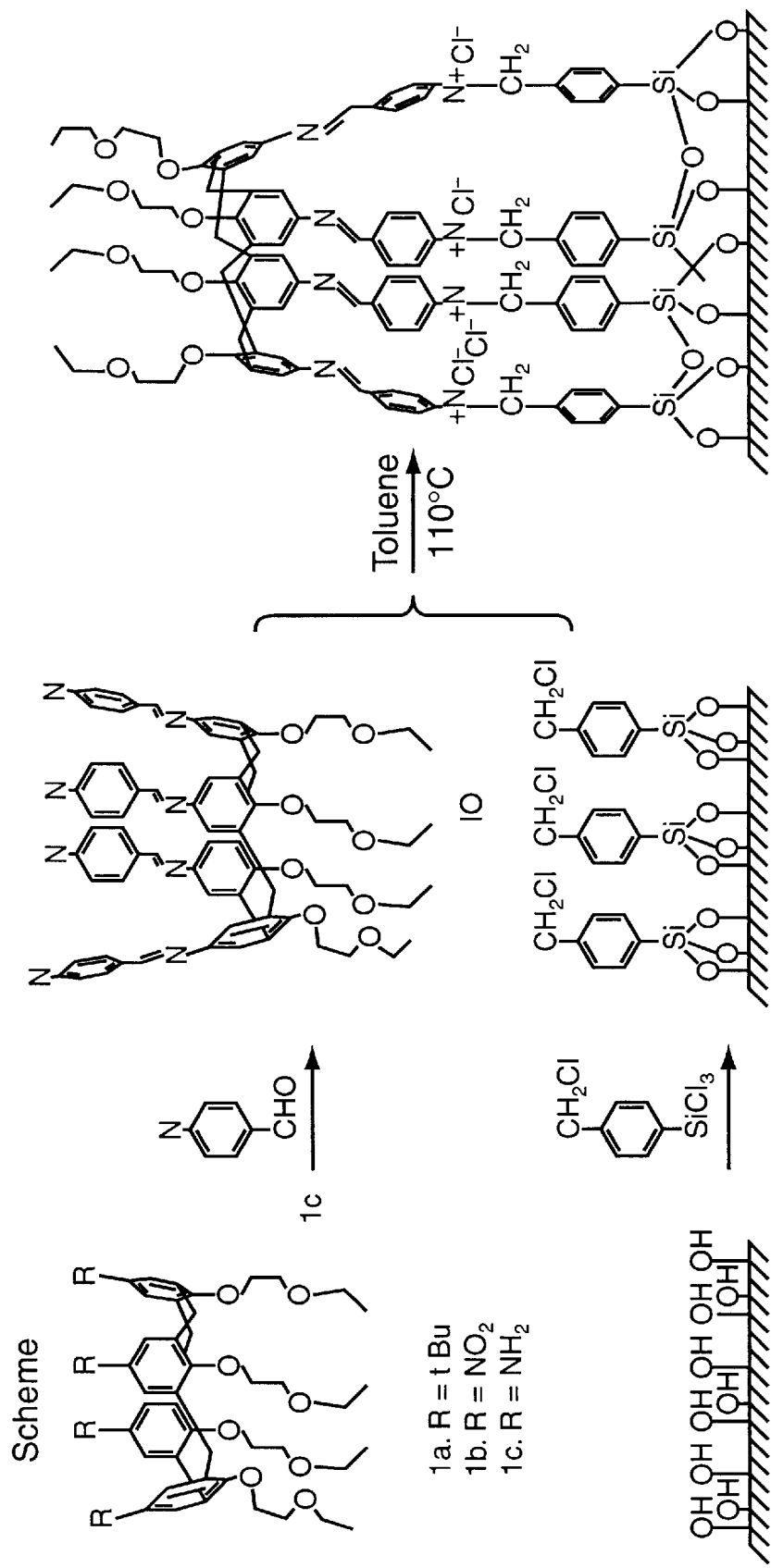
FIG. 1(b) is another schematic representation of the synthesis of surface building blocks—calix[4]arene-based molecular pyramids and strategy for the construction of self assembled monolayer architectures. (1) acetic acid, ethanol (reflux); 2) chloroform, 25° C.; 3) toluene, 110 ° C.

The scheme of FIG. 1(b) involves functionalzation of the upper rim of the calixarene by incorporation of pyridyl units.

Compound (1a) and (1b) were synthesized according to the literature procedures of Chang et al. And Verboom et al. (see above). Reduction of nitrocalixarene (1b) gave para-aminocalix[4]arene (1c) in 79% yield. The condensation of para-amino-ethoxyethylethercalix[4]arene (1c) with 4-pryidylcarboxaldehyde gave the desired cone-shaped chromophoric precursor 10. All the compounds were characterized by $^1$H NMR and IR. The $^1$H NMR spectrum of 10 in CDCl$_3$ confirmed that 10 had a rigid cone conformation with the D--π-A dipolar units aligned in the same direction, since the two doublets (J=12 Hz) corresponding to equatorial and axial methylene protons, respectively, were observed. Long ethoxyethyl groups prevent flip-over of the individual NLO units in 10 and the cone confirmation is virtually frozen. Then, with this molecular building block having a rigid structure and fixed dipole orientation, the resultant self assembled monolayer of 10 should have higher alignment, better thermal and structural stability that self assembled monolayers using a single chromophoric unit.

The construction of covalently bonded self-assembled monolayers of (4) is based on the approach reported by Li et al., J. Am. Chem. Soc., vol 112, p. 7389 (1990). Silicon wafer and fused silica substrates were treated with a silane coupling agent p-chloromethylphenyltrichlorosilane in either toluene or chloroform for 24 hours, followed by an incubation of the silylated substrate in 1 millimoles (mM) of compound (4) in toluene at 110° C. for three days to quaternize the pyridyl groups on (2). The monolayer was thoroughly cleaned by sonication in CHCl$_3$, followed by vigorous rinsing with CHCl$_3$ to remove any noncovalently bonded surface species.

The self-assembled monolayers consisting of pyramid-like imine derivative of calix[4]stilbazole were characterized by surface polarized FTIR using internal attenuated total reflection (ATR) within a Ge hemisphere crystal with p-polarization at 45 degree of incidence. The formation of covalent C—N bonds between the calix[4]stilbazole imine and the silane anchoring layer was revealed by the presence of pyridinium species ($\upsilon$=1635 cm$^{-1}$) on the surface. The fact that no pyridine mode at 1595 cm$^{-1}$ was observed indicated that the surface quaternization was complete, leaving no dangling stilbazole imine structures in the self-assembled monolayer. The electronic absorption spectrum of the monolayer exhibited a characteristic charge transfer transition at 390 nm (FIG. 1), which is consistent with the observation of the pyridinium mode; both indicate successful quaternization reaction. The absorption peak of the monolayer red-shifted to 390 nm from 350 nm is also consistent with the presence of stronger electron withdrawing groups (pyridinium vs. pyridyl group) in the film. The optical absorptions from both surface IR ($A_{1635\ cm^{-1}}$=2×10$^{-3}$) and UV-vis ($A_{390\ nm}$=3.5×10$^{-3}$) suggest that the thickness for these calix[4]stilbazolium films is on the order of a typical single monolayer, taking into account the chromophore orientation effects.

Second harmonic generation (SHG) was measured for fundamental wavelengths between 890 nm and 750 nm. The laser source was a passively mode-locked Ti:Sapphire laser (Coherent Mira) operating in either femtosecond (150 fs autocorrelation width) or picosecond (2 ps width) mode, with 100 MHz repetition rate. The SHG signal was measured as a function of incident angle for p-polarized SHG, and both s- and p-polarized fundamental. The SHG light was filtered from the fundamental with a combination of glass filters (Schott BG-39) and a single-grating monochrometer. Light was detected with a cooled photomultiplier tube, by synchronous detection with a digital lockin amplifier referenced to a chopper in the fundamental beam path.

Figure 2:
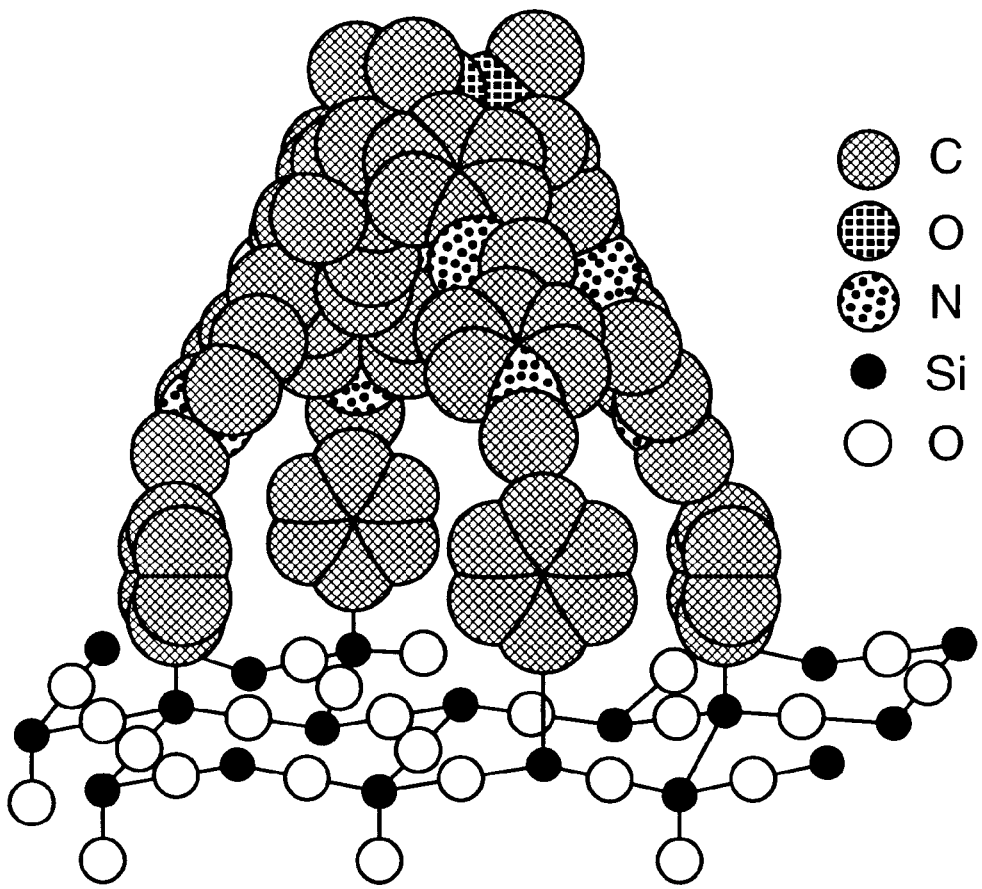
FIG. 2 shows a space filling model of a self assembled, calix[4]arene-based monolayer on an idealized silica surface.
Figure 3:
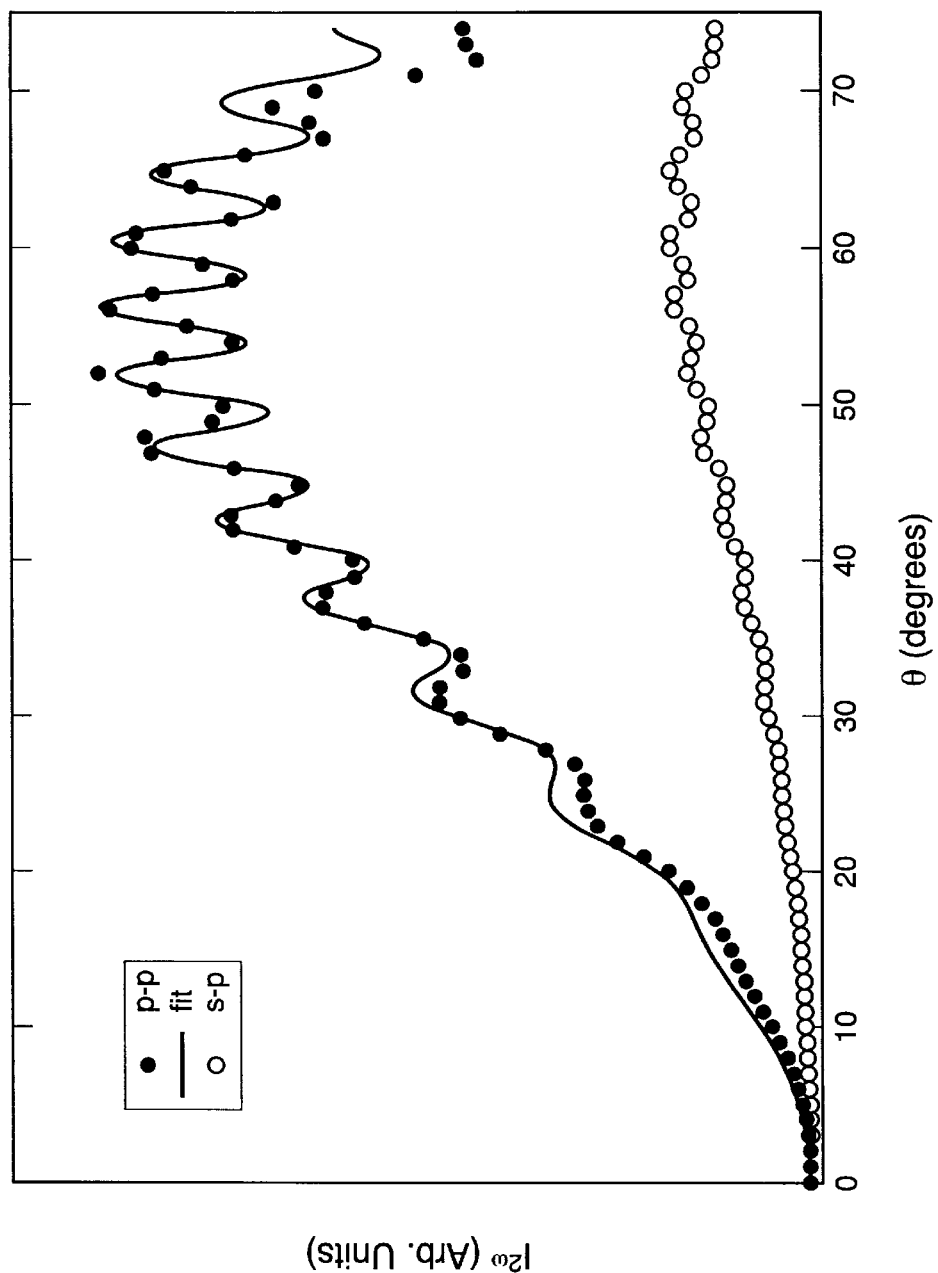
FIG. 3 is a graph showing a single harmonic generation (SHG) signal versus incident angle for p-polarized SHG from both p- (solid circles) and s- polarized (open circles) fundamental at a wavelength of 862 nm, plotted together with a best theoretical fit (solid line).
Figure 4:
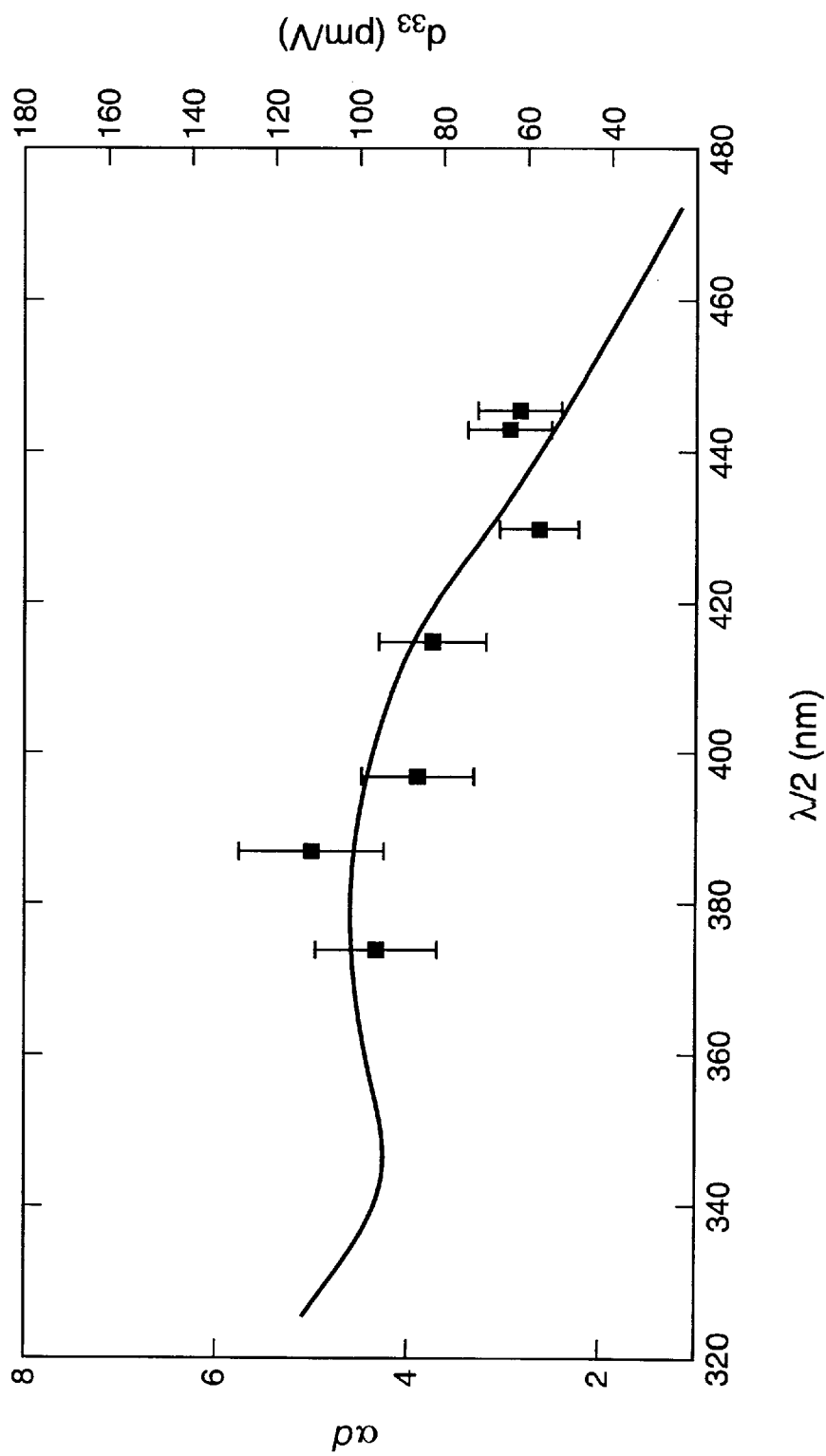
FIG. 4 is a graph showing second-order nonlinear susceptibility $d_{33}$ (solid squares) versus fundamental wavelength (top and right axes) or second harmonic wavelength (bottom and right axes) along with linear absorption spectrum $\alpha d$ (solid line) versus wavelength (bottom and left axes) for a self-assembled monolayer of (2). The lowest two photon resonance is at 390 nm corresponding to 780 nm in $d_{33}$ dispersion.
Figure 5:
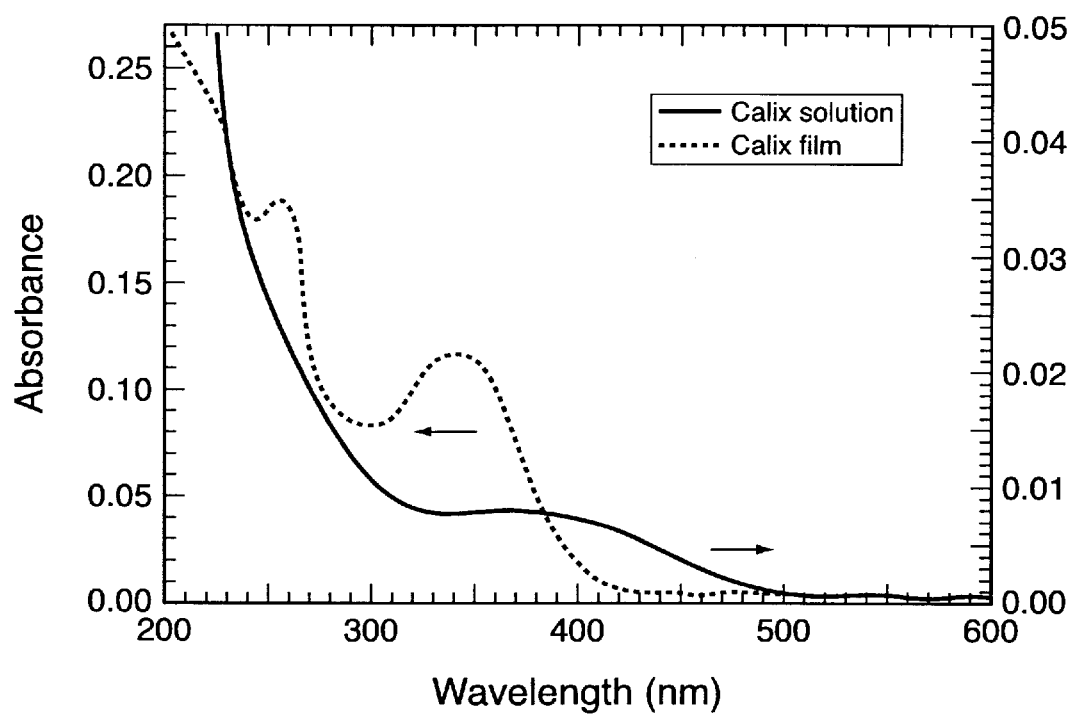
FIG. 5 is a graph showing the UV-vis absorption spectra of the imine derivative of calix[4]stilbazole in methanol (dotted line) and the imine derivative of calix[4]stilbazolium on a silica substrate (solid line), respectively.

In the cone-shaped symmetry ($C_{\infty v}$), there are only two independent elements of the second-order nonlinear susceptibility, $d_{33}$ and $d_{31}$=$d_{32}$, in these self-assembled monolayers. To determine the values of the second-order nonlinear susceptibility, the ratio of $d_{33}$ to $d_{31}$ was first derived by comparison of the angular dependence of the measured p-polarized SHG from p-polarized fundamental versus s-polarized fundamental. The absolute $d_{33}$ values were then deduced by comparison with SHG measured from a Y-cut quartz crystal, with fundamental polarization along the optic axis. FIG. 2 shows the angular dependence of the measured SHG for p-polarized fundamental, and p-polarized SHG, for the imine derivative of a calix[4]stilbazole monolayer at a fundamental wavelength of 890 nm. In FIG. 2, the data for 2 ps pulses are shown along with the theoretical best fits. There are two important features in this data: the overall envelope shape, which is determined by the orientation of the individual molecules in the monolayer, and the interference fringes, which arise from the two identical monolayers on opposite sides of the fused silica substrate. For the 1 mm thick silica samples considered here, effects of pulse walkoff due to mismatched group velocities of the fundamental and SH pulses can be neglected. The solid line in FIG. 2 is the best fit to an expression developed in Ref. 2b, modulated by the interference term, which has the same physical origin and angular dependence as the well-known Maker fringes in bulk samples. These data indicate that the average orientation of the stilbazole chromophores is $\Psi$~36° relative to the surface normal, and that the absolute magnitude of $d_{33}$~60 pm/V, at a fundamental wavelength of 890 nm. The wavelength dependence (fundamental $\lambda$=890–750 nm; harmonic $\lambda$=445–375 nm) indicates a gradual increase of $d_{33}$ as the fundamental moves to shorter wavelength, consistent with normal refractive index dispersion in this spectral region approaching the charge transfer resonance at 390 nm. A value of $d_{33}$~90 pm/V at $\lambda$=750 nm was found indicating a slight two photon enhancement at shorter wavelength.

A calix[4]arene-based NLO chromophoric building block has been synthesized and covalently bound self-assembled monolayers on Si wafers and SiO$_2$ substrates have been constructed. This is a significant step forward in molecular architecture by demonstrating the formation of self-assembled monomolecular layers of "pyramid"-like structures. Structural interlocking via the bridging methylene groups among the D-π-A units yields improved stability, exceptionally large second-order nonlinearities ($d_{33}$~60 pm/V;$\lambda$=890 nm), and optimized molecular dipole alignment. Spectroscopic $\chi^{(2)}$ measurements were carried out in the near infrared region and two photon resonance enhancement was found to be minimal. Using molecular chromophores, pre-assembled into supermolecules to achieve fixed orientation at the molecular level has thus been demonstrated to be a viable approach to the construction of polar self-assembled monolayers. Substitutions at both ends of the calix[4]arene NLO chromophores may allow construction of multilayer molecular films for nonlinear optical uses.

Although the present invention has been described with reference to specific details, it is not intended that such details should be regarded as limitations upon the scope of the invention, except as and to the extent that they are included in the accompanying claims.

What is claimed is:

1. A nonlinear optical material comprising:
   a defined substrate;
   a silane coupling means bonded to said substrate; and,
   a structurally interlocked chromophore, said interlocking through chemical bonding a multiple of dipolar molecules into cone-shaped supermolecules.

2. The nonlinear optical material of claim 1 wherein said interlocked adjacent groups of the chromophore are aromatic groups.

3. A method of forming a nonlinear optical material comprising:
   structurally interlocking through chemical bonding a multiple of dipolar molecules into cone-shaped supermolecules; and,
   chemically bonding said cone-shaped supermolecules onto a defined substrate.

* * * * *